United States Patent
Soderlund (10) Patent No.: US 10,700,921 B2
(45) Date of Patent: Jun. 30, 2020

(54) AUTOMATIC SYMPTOM DATA COLLECTION IN CLOUD DEPLOYMENT

(71) Applicant: NOKIA SOLUTIONS AND NETWORKS OY, Espoo (FI)

(72) Inventor: Jani Olavi Soderlund, Vantaa (FI)

(73) Assignee: Nokia Solutions and Networks Oy, Espoo (FI)

( * ) Notice: Subject to any disclaimer, the term of this patent is extended or adjusted under 35 U.S.C. 154(b) by 211 days.

(21) Appl. No.: 15/751,747

(22) PCT Filed: Aug. 10, 2015

(86) PCT No.: PCT/EP2015/068358
§ 371 (c)(1),
(2) Date: Feb. 9, 2018

(87) PCT Pub. No.: WO2017/025126
PCT Pub. Date: Feb. 16, 2017

(65) Prior Publication Data
US 2018/0234288 A1    Aug. 16, 2018

(51) Int. Cl.
G06F 11/00 (2006.01)
H04L 12/24 (2006.01)
G06F 11/07 (2006.01)

(52) U.S. Cl.
CPC ........ *H04L 41/0645* (2013.01); *G06F 11/079* (2013.01); *G06F 11/0712* (2013.01); *G06F 11/0793* (2013.01); *H04L 41/064* (2013.01); *H04L 41/0659* (2013.01); *H04L 41/022* (2013.01)

(58) Field of Classification Search
CPC . G06F 11/0712; G06F 11/079; G06F 11/0793
See application file for complete search history.

(56) References Cited

U.S. PATENT DOCUMENTS

| | | | |
|---|---|---|---|
| 9,021,310 B1* | 4/2015 | McCabe | H04L 41/0659 714/43 |
| 2012/0208562 A1 | 8/2012 | Wilkin et al. | |
| 2015/0026327 A1* | 1/2015 | Tang | H04L 41/044 709/223 |
| 2015/0089331 A1 | 3/2015 | Skerry et al. | |
| 2016/0224409 A1* | 8/2016 | Liu | H04L 67/10 |

OTHER PUBLICATIONS

Clarke, Don, et al.: "Network Functions Virtualisation", Oct. 22-24, 2012 at the "SDN and Open Flow World Congress", Darmstadt-Germany.

(Continued)

*Primary Examiner* — Katherine Lin
(74) *Attorney, Agent, or Firm* — Laurence A. Greenberg; Werner H. Stemer; Ralph E. Locher (57) ABSTRACT

Apparatuses, methods, and computer-readable media regard automatic symptom data collection in cloud deployment. The method includes detecting a failure, determining when to trigger symptom data collection for collecting information about the failure, and transmitting an indication of the triggering of the symptom data collection to a management function of the virtual network function.

26 Claims, 6 Drawing Sheets

(56) References Cited

OTHER PUBLICATIONS

ETSI GS NFV-REL004 V0.0.7 (Jul. 2015); Network Functions Virtualization (NFV); Assurance; Report on Active Monitoring and Failure Detection.
ETSI GS NFV-REL 001 V1.1.1 (Jan. 2015); Network Functions Virtualisation (NFV); Resiliency Requirements.
ETSI GS NFV 002 V1.2.1 (Dec. 2014); Network Functions Virtualisation (NFV); Architectural Framework.
ETSI GS NFV 003 v1.2.1 (Dec. 2014); Network Functions Virtualisation (NFV); Terminology for Main Concepts in NFV.
ETSI GS NFV-MAN 001 V1.1.1 (Dec. 2014); Network Functions Virtualisation (NFV); Management and Orchestration.
Hawilo Hassan et al: "NFV: State of the Art, Challenges, and Implementation in Next Generation Mobile Networks (vEPC)", IEEE Network, IEEE Service Center, New York, NY, US, vol. 28, No. 6, Nov. 1, 2014 (Nov. 1, 2014), pp. 18-26, XP011565076, ISSN: 0890-8044, DOI: 10.1109/MNET.2014.6963800 [retrieved on Nov. 20, 2014].

* cited by examiner

AUTOMATIC SYMPTOM DATA COLLECTION IN CLOUD DEPLOYMENT

FIELD OF THE INVENTION

The present invention relates to apparatuses, methods, systems, computer programs, computer program products and computer-readable media regarding automatic symptom data collection in cloud deployment.

Abbreviations/Glossary

In the description of the present invention, the following expressions will be used as defined in document [1].

| | |
|---|---|
| API | Application Programming Interface |
| BSS | Business Support System |
| EMS | Element Management System |
| EPC | Evolved Packet Core |
| ETSI | European Telecommunications Standards Institute |
| FCAPS | Fault Management, Configuration Management, Accounting Management, Performance Management, Security Management |
| GW | Gateway |
| HA | High Availability |
| LTE | Long Term Evolution |
| MME | Mobility Management Entity |
| NFV | Network Function Virtualization |
| NMS | Network Management System |
| OSS | Operating Support System |
| REST | Representational State Transfer |
| SAE | System Architecture Evolution |
| SDN | Software Defined Network |
| SW | Software |
| VIM | Virtualized Infrastructure Manager |
| VM | Virtual Machine |
| VNF | Virtual Network Function |
| VNFM | Virtual Network Function Manager |
| VNFO | Virtual Network Function Orchestrator |

Network Function (NF): functional block within a network infrastructure that has well-defined external interfaces and well-defined functional behavior. In practical terms, a Network Function is today often a network node or physical appliance.

Network Functions Virtualization (NFV): principle of separating network functions from the hardware they run on by using virtual hardware abstraction Network Functions Virtualization Infrastructure (NFVI): totality of all hardware and software components that build up the environment in which VNFs are deployed. The NFV-Infrastructure can span across several locations, e.g. places where data centers are operated. The network providing connectivity between these locations is regarded to be part of the NFVInfrastructure. NFV-Infrastructure and VNF are the top-level conceptual entities in the scope of Network Function Virtualization. All other components are sub-entities of these two main entities.

Network Functions Virtualization Management and Orchestration (NFV-MANO): functions collectively provided by NFVO, VNFM, and VIM Network Functions Virtualization Orchestrator (NFVO): functional block that manages the Network Service (NS) lifecycle and coordinates the management of NS lifecycle, VNF lifecycle (supported by the VNFM) and NFVI resources (supported by the VIM) to ensure an optimized allocation of the necessary resources and connectivity.

Virtual Machine (VM): virtualized computation environment that behaves very much like a physical computer/server.

Virtual Network: virtual network routes information among the network interfaces of VM instances and physical network interfaces, providing the necessary connectivity. The virtual network is bounded by its set of permissible network interfaces.

Virtualized Infrastructure Manager (VIM): functional block that is responsible for controlling and managing the NFVI compute, storage and network resources, usually within one operator's Infrastructure Domain (e.g. NFVI-PoP).

Virtualized Network Function (VNF): implementation of an NF that can be deployed on a Network Function Virtualization Infrastructure (NFVI).

Virtualized Network Function Manager (VNFM): functional block that is responsible for the lifecycle management of VNF.

Failure: In the context of the present application, a failure is to be understood to cover many potential error scenarios, not just a failure in a network. Thus, a failure is not limited to connectivity/networking services. The failure can also mean a failure of the application software, virtual machine, hypervisor, host operating system, host hardware, etc. The failure itself can be crash, getting stuck, or just performance deterioration, i.e. something that needs further analysis either online or as post-mortem activity.

BACKGROUND OF THE INVENTION

Figure 1:
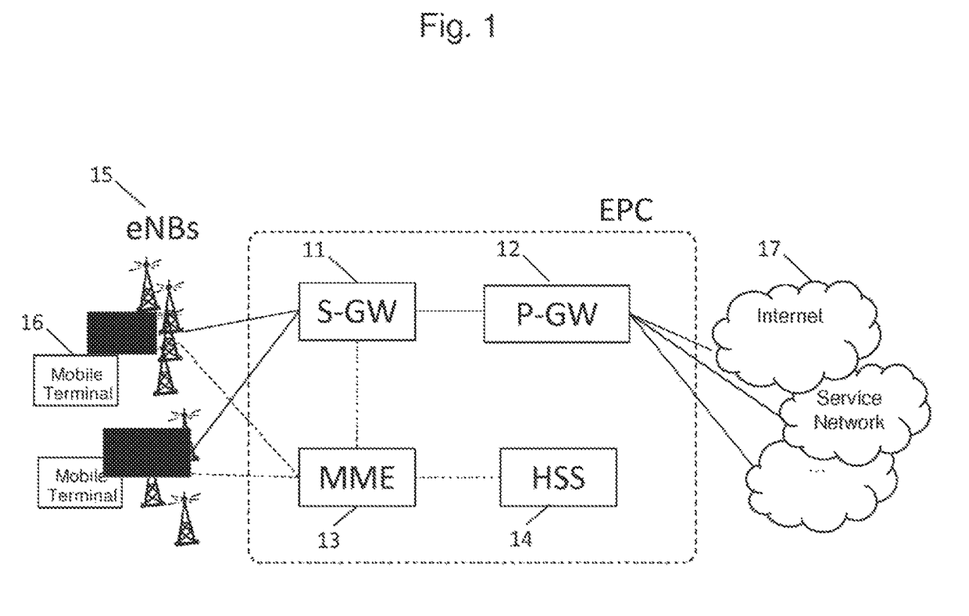
FIG. 1 is a block diagram illustrating a basic architecture of the EPC.

The Evolved Packet Core (EPC) mobile network, as defined by 3GPP, consists of multiple functional elements like S-GW (Serving Gateway) 11, P-GW (PDN-GW, Packet Data Network Gateway) 12, MME (Mobility Management Entity) 13 and HSS (Home Subscriber Server) 14, as shown in FIG. 1. The EPC is connected via the S-GW 11 to eNBs (eNodeBs) 15 which in turn are connected to mobile terminals 16. Further, the EPC is connected via the P-GW 12 to external networks 17, like e.g. the internet (IP network), service networks or the like.

Currently, each element collects own troubleshooting and diagnostics data as part of normal runtime operation. When a fault happens, the operator is instructed to collect so-called standard symptom data and send that data to the manufacturer/vendor of the elements for more detailed analysis. There are also tools developed in-house by the manufacturer/vendor for abstracting the real interfaces and commands used for the data collection per network element, exposing a more unified interface towards the operator. The actual data contained in the collected package is often very detailed and specific per network element software and hardware. This is made possible since the application has access to all the necessary information about the runtime environment, to the level of hardware registers and embedded software (for information like versions, packet counters, etc).

For the post-mortem troubleshooting to be effective, the data must be collected as close to the actual fault event as possible, in order to make sure that no data has been overwritten or lost since the fault.

In the legacy network deployments, the network elements have been quite standalone boxes, having management (north bound) interfaces via (de-facto) standard interfaces towards NMS (Network Management System).

In the cloud deployments and the emerging ETSI NFV (European Telecommunications Standards Institute Network Function Virtualization) framework which is commonly used as the reference, the application access to the information about runtime infrastructure will be limited and there are more possibilities offered by the management domain for harmonized fault management.

Figure 2:
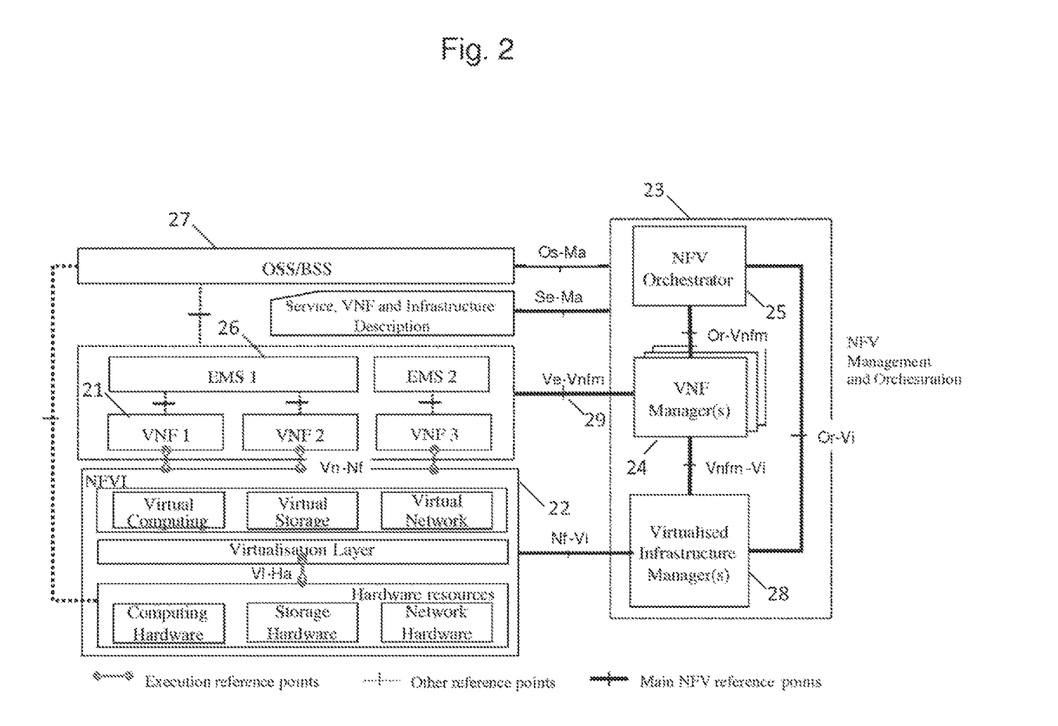
FIG. 2 is a diagram illustrating an example of the ETSI NFV architectural framework to which some example versions of the present invention are applicable.

FIG. 2 is a block diagram illustrating the ETSI NFV architectural framework as defined in document [2].

Network Functions Virtualization envisages the implementation of NFs as software-only entities that run over the NFV Infrastructure (NFVI). FIG. 2 illustrates the high-level NFV framework. As such, three main working domains are identified in NFV:

Virtualized Network Function 21, as the software implementation of a network function which is capable of running over the NFVI.

NFV Infrastructure (NFVI) 22, including the diversity of physical resources and how these can be virtualized. NFVI supports the execution of the VNFs.

NFV Management and Orchestration 23, which covers the orchestration and lifecycle management of physical and/or software resources that support the infrastructure virtualization, and the lifecycle management of VNFs. NFV Management and Orchestration focuses on all virtualization-specific management tasks necessary in the NFV framework.

In this NFV context, it can be seen that new elements—VNF Manager 24 and NFV Orchestrator 25—have emerged along with existing EMS (Element Management System) 26 and OSS/BSS (Operating Support System/Business Support System) 27 solutions. These offer also possibilities for better capabilities for post-mortem analysis. Currently, the VNFM 24 (Virtual Network Function Manager) (e.g. Nokia CAM (Cloud Application Manager)) is managing only same vendors VNFs, but this can be seen as something that will need to change—already now there are real use cases where the VNFM 24 would need to manage at least partially $3^{rd}$ party components integrated with, for example, Nokia solution.

High availability (resiliency (which is the ability of the NFV framework to limit disruption and return to normal or at a minimum acceptable service delivery level in the face of a fault, failure, or an event that disrupts the normal operation) and failure tolerance/recovery) are mandatory in the telecom environment, and moreover, with emergence of Voice over LTE (VoLTE), the requirements towards recovery times are very strict (at least <1 s, the shorter the better). The resiliency needed in the network elements consists usually of multiple layers. The VNFM 24/VIM (Virtualized Infrastructure Manager) 28 monitor the physical resources and virtual machines running on top of the infrastructure, and the VNF itself monitors the application status with some specialized built-in service. The latter part is essential for stateful 2N or N+M active-standby replication solutions, which are needed in order to reach the required recovery times without losing sessions in the operation. Having multiple layers acting on their own for specific sets of faults on the other hand makes it more complicated to be able to automate symptom data collection.

The main problem in the cloud deployment compared to legacy vendor-specific deployments is that it can no longer be assumed that the application is able to collect all the information regarding the runtime infrastructure for the post-mortem analysis. Information about host layer (hardware and software including hypervisor, host operating system and virtual networking) is vital for understanding many faults which are visible for the operator in the actual application layer (VNF).

Especially, in elements like gateways handling the user plane traffic and which are therefore very sensitive to throughput and latency/jitter, the host layer has potentially huge effect on the performance of the application. This data must be available for later analysis, and it must be possible to correlate this information with the application specific data.

The ETSI NFV Management and Orchestration (MANO) does not currently cover troubleshooting as it seems to have been thought to be a matter of implementation rather than a matter of specification.

In this invention, it is anyway proposed that the centralized and automatic data collection mechanism should be working also in the multi-vendor environment even if the data content remains network element specific.

REFERENCES

[1]: ETSI GS NFV 003 V1.2.1 (2014 December) Network Functions Virtualization (NFV); Terminology for Main Concepts in NFV

[2]: ETSI GS NFV 002 V1.2.1 (2014 December) Network Functions Virtualization (NFV); Architectural Framework

SUMMARY OF THE INVENTION

It is therefore an object of the present invention to overcome the above mentioned problems and to provide apparatuses, methods, systems, computer programs, computer program products and computer-readable media regarding automatic symptom data collection in cloud deployment.

According to an aspect of the present invention there is provided a method for use in a virtual network function comprising:
  detecting a failure,
  determining to trigger symptom data collection for collecting information about the failure, and
  transmitting an indication triggering the symptom data collection to a management function of the virtual network function.

According to an aspect of the present invention there is provided a method for use in a management function comprising:
  receiving an indication triggering symptom data collection from a network function,
  collecting information about a failure indicated in the received indication, and
  storing the collected information in a database.

According to an aspect of the present invention there is provided an apparatus for use in a virtual network function, comprising:
  at least one processor,
  and
  at least one memory for storing instructions to be executed by the processor, wherein
  the at least one memory and the instructions are configured to, with the at least one processor, cause the apparatus at least to perform:
  detecting a failure,
  determining to trigger symptom data collection for collecting information about the failure, and
  transmitting an indication triggering the symptom data collection to a management function of the virtual network function.

According to an aspect of the present invention there is provided an apparatus for use in a management function, comprising:
  at least one processor,
  and at least one memory for storing instructions to be executed by the processor, wherein the at least one memory and the instructions are configured to, with the at least one processor, cause the apparatus at least to perform:

receiving an indication triggering symptom data collection from a network function,     collecting information about a failure indicated in the received indication, and     storing the collected information in a database.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to a still further aspect of the present invention there is provided an apparatus comprising:

means for detecting a failure, means for determining to trigger symptom data collection for collecting information about the failure, and     means for transmitting an indication triggering the symptom data collection to a management function of the virtual network function.

According to a still further aspect of the present invention there is provided an apparatus comprising:

means for receiving an indication triggering symptom data collection from a network function,     means for collecting information about a failure indicated in the received indication, and     means for storing the collected information in a database.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks, like for example 5G communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, network access control elements like AAA servers and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

The symptom data collection in cloud deployment will inevitably be a shared responsibility. The VNF 21 itself can only collect information about itself, and what limited information is exposed to it by the host layer. It must therefore be conserved a VNFM functionality to collect information about the runtime infrastructure, as it has the necessary interfaces in place towards the VIM 28 (like OpenStack, VMware).

The symptom data collection can be divided into three separate operation flows:
1. Manually triggered operation
2. Automatically triggered operation based on information about failure from VNFM 24/VIM 28
3. Automatically triggered operation based on information about failure from VNF 21

Thus, the logical place for the external interface (API) for triggering the standard symptom collection is the VNF Manager 24, as it has access to both the VNF and VIM information. Operations 1) and 2) are triggered top-down, i.e. from the VNF manager 24 towards VNF(s) 21 and VIM 28. In the present invention, it is concentrated on the case 3), which requires communication in the other direction, from the VNF 21 to the VNF Manager 24.

In the case 3), the usual trigger function is the HA (High Availability) service implemented in the VNF 21 itself. It can react to application specific faults like process crashes by performing switchovers between active-standby processes/VMs and restarting the failed software. These actions will not require active participation from the VNFM 24 or VIM 28, and are visible only implicitly via the FCAPS data (like alarms raised by the VNF).

According to some certain aspects of the present invention, it is proposed to add a possibility to trigger standard symptom collection in the Ve-Vnfm interface 29 by the VNF 21. This interface is at least in the first phase going to be semi-proprietary, i.e. defined per vendor but opened up for partners for integration needs.

The interface 29 may also allow specifying in detail the failed VM/functional unit/software component, in order for the VNFM 24 to collect only specific data from VIM 28, and similarly allow the VNF 21 to pack only the relevant information (e.g. core dump files from the crashed SW (Software) from a certain time window) to the collected data file.

That is, the failed component is identified by the VNF 21 and the VNFM 24 needs information about the component (e.g. VM/functional unit/software component) in order to pass this information to the VIM 28 for specific data collection.

Thus, according to some example versions of the present invention, the VNF 21 identifies the failed VM/functional unit/software component and transmits only the relevant information to the VNFM 24. Then, for example, the VNFM provides just the name of the failed VM/functional unit/ software component to the VIM and the VIM provides all necessary and relevant information about it.

Alternatively, the VNFM might query separately available APIs to collect all possible information.

The mitigation actions are needed to be triggered as soon as possible. The HA service may interact with the diagnostics function inside the VNF 21 to e.g. only isolate the failed software for a period of time to allow data collection, before restarting and re-activating this software.

The VNFM 24 will collect information from both VNF 21 and the VIM 28, combine the data and store it to operator specific storage, from where it can be shared with the vendor for further analysis.

The actual interface between VNF 21 and VNFM 24 must be based on an easily extensible protocol, and thus, most commonly this would be realized using a RESTful API with specific resources (scripts) to trigger the data collection.

Optionally, this interface could allow the VNFM 24 to directly tell the VNF 21 the target location of the symptom data (in order to avoid transferring it first to VNFM 24 and from there to the persistent storage).

Figure 3:
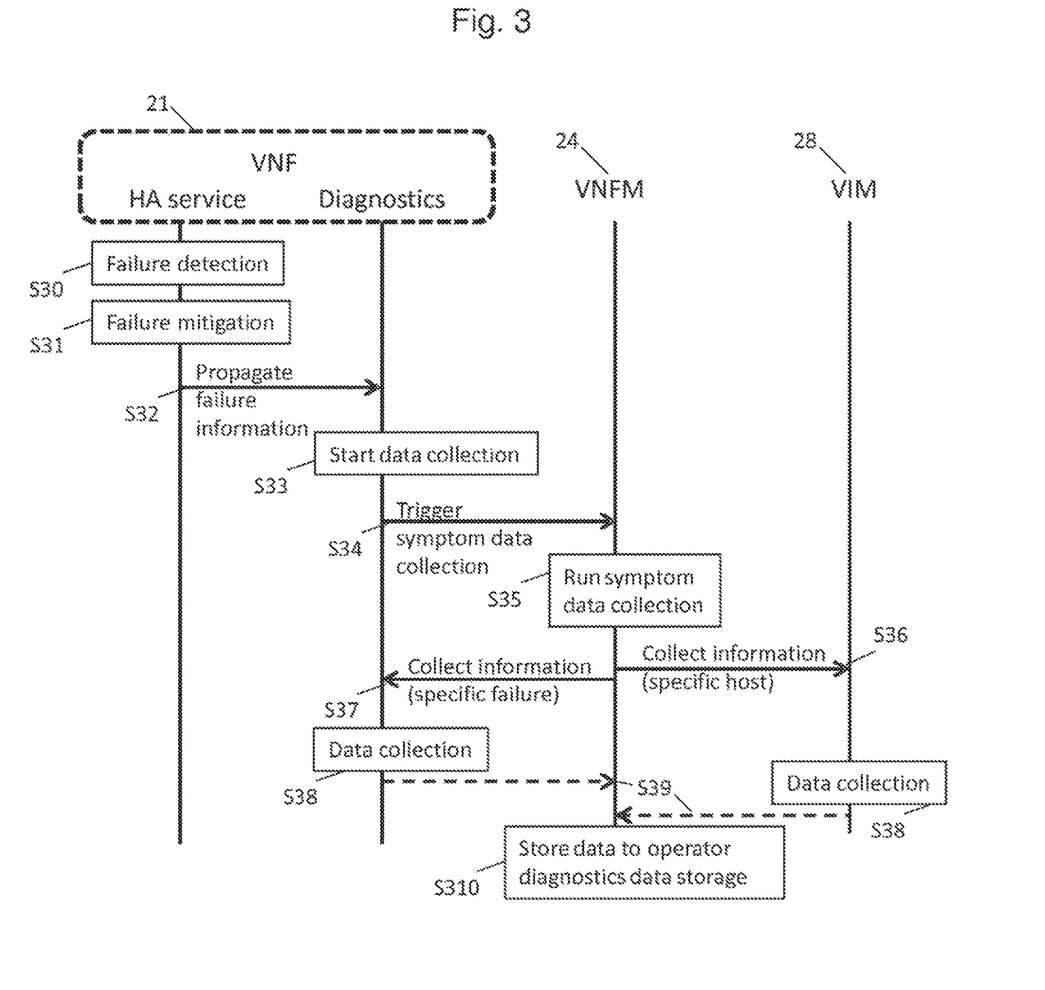
FIG. 3 is a diagram illustrating an example of a workflow for the VNF triggered symptom data collection according to some example versions of the present invention.

FIG. 3 is a diagram illustrating an example of a workflow for the VNF triggered symptom data collection according to some example versions of the present invention.

As shown in FIG. 3, the HA service of the VNF 21 performs failure detection in a step S30 and failure mitigation in a step S31 and propagates the failure information in a step S32 to the diagnostics function of the VNF 21. The diagnostics function determines to start data collection in a step S33 and sends an indication triggering the data symptom collection in a step S34 to the VNF Manager 24. Upon receiving the trigger from the VNF 21, the VNF Manager 24 runs the symptom data collection processing in a step S35 and collects information from both the VNF 21 and the VIM 28. In particular, the VNF Manager 24 sends an instruction to collect specific host information to the VIM 28 in a step S36 and sends an instruction to collect specific failure information to the VNF 21 in a step S37. After data collection being performed by the VNF 21 and the VIM 28 (step S38), the VNF Manager 24 receives the data from the VNF 21 and the VIM 28 and combines the collected data in a step S39. Then, the VNF Manager 24 stores the collected and combines data in the operator diagnostics data storage in a step S310.

In the following, a more general description of example versions of the present invention is made with respect to FIGS. 4 to 6.

Figure 4:
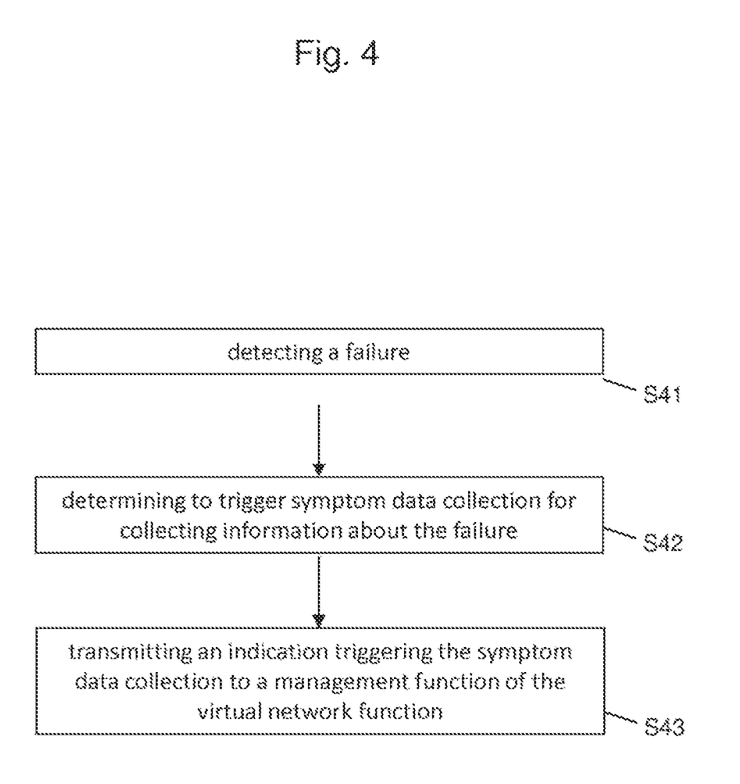
FIG. 4 is a flowchart illustrating an example of a method according to some example versions of the present invention.

FIG. 4 is a flowchart illustrating an example of a method according to some example versions of the present invention.

According to example versions of the present invention, the method may be implemented in or may be part of a virtual network function or the like. The method comprises detecting a failure in a step S41, determining to trigger symptom data collection for collecting information about the failure in a step S42, and transmitting an indication triggering the symptom data collection to a management function of the virtual network function in a step S43.

According to some example versions of the present invention, the method further comprises receiving a request for providing information about the failure from the management function, and transmitting the information about the failure to the management function of the virtual network function.

According to some example versions of the present invention, the method further comprises receiving a request for providing information about the failure from the management function and a target location for the information, and transmitting the information about the failure directly to the target location.

According to some example versions of the present invention, the method further comprises identifying specific information relevant for the failure, and transmitting only the specific information to the management function.

According to some example versions of the present invention, the method further comprises the specific information relevant for the failure is information about a component and/or software impacted by the failure and/or information in a certain time window during which the failure occurred.

According to some example versions of the present invention, the method further comprises performing processing for mitigating the impact of the failure.

According to some example versions of the present invention, the processing includes isolating software impacted by the failure for a predetermined time and restarting and/or reactivating the software.

Figure 5:
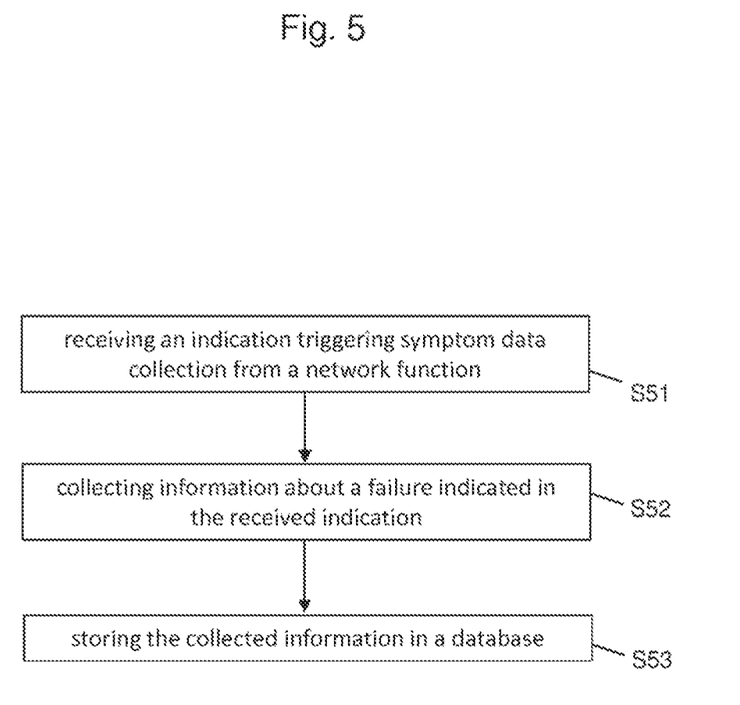
FIG. 5 is a flowchart illustrating another example of a method according to some example versions of the present invention.

FIG. 5 is a flowchart illustrating another example of a method according to some example versions of the present invention.

According to example versions of the present invention, the method may be implemented in or may be part of a management function, like for example a virtual network function manager or the like. The method comprises receiving an indication triggering symptom data collection from a network function in a step S51, collecting information about a failure indicated in the received indication in a step S52, and storing the collected information in a database in a step S53.

According to some example versions of the present invention, collecting the information about the failure comprises requesting information about the failure from the network function and the virtualized infrastructure manager, collecting information about the failure from the network function, collecting information about the failure from a virtualized infrastructure manager, combining the collected information, and storing the combined information in the database.

According to some example versions of the present invention, the method further comprises collecting only specific information relevant for the failure from the network function, and requesting only specific information relevant for the failure from the virtualized infrastructure manager based on the specific information collected from the network function.

According to some example versions of the present invention, requesting the specific information from the virtualized infrastructure manager includes transmitting information regarding a failed component to the virtualized infrastructure manager, and collecting specific data about the failed component from the virtualized infrastructure manager based on the information regarding the failed component.

According to some example versions of the present invention, the method further comprises transmitting a query to separate available application programming interfaces to collect specific information relevant for the failure.

According to some example versions of the present invention, the specific information relevant for the failure is information about a component and/or software impacted by the failure and/or information in a certain time window during which the failure occurred.

Figure 6:
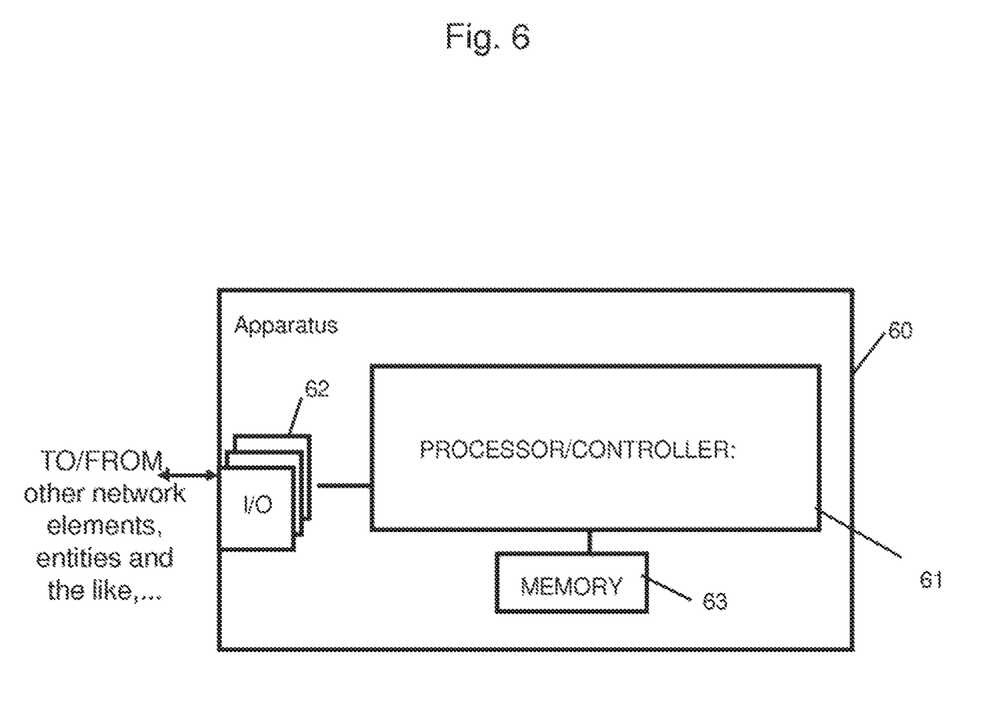
FIG. 6 is a block diagram illustrating an example of an apparatus according to some example versions of the present invention.

FIG. 6 is a block diagram illustrating an example of an apparatus according to some example versions of the present invention.

In FIG. 6, a block circuit diagram illustrating a configuration of an apparatus 60 is shown, which is configured to implement the above described aspects of the invention. It is to be noted that the apparatus 60 shown in FIG. 6 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 60 may comprise a processing function or processor 61, such as a CPU or the like, which executes instructions given by programs or the like. The processor 61 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 62 denotes transceiver or input/output (I/O) units (interfaces) connected to the processor 61. The I/O units 62 may be used for communicating with one or more other network elements, entities, terminals or the like. The I/O units 62 may be a combined unit comprising communication equipment towards several network elements, or may comprise a distributed structure with a plurality of different interfaces for different network elements. The apparatus 60 further comprises at least one memory 63 usable, for example, for storing data and programs to be executed by the processor 61 and/or as a working storage of the processor 61.

The processor 61 is configured to execute processing related to the above described aspects. In particular, the apparatus 60 may be implemented in or may be part of a virtual network function or the like, and may be configured to perform a method as described in connection with FIG. 4. Thus, the processor 61 is configured to perform detecting a failure, determining to trigger symptom data collection for collecting information about the failure, and transmitting an indication triggering the symptom data collection to a management function of the virtual network function.

According to some example versions of the present invention, the apparatus 60 may be implemented in or may be part of a management function, like a virtual network function manager or the like, and may be configured to perform a method as described in connection with FIG. 5. Thus, the processor 61 is configured to perform receiving an indication triggering symptom data collection from a network function, collecting information about a failure indicated in the received indication, and storing the collected information in a database.

For further details regarding the functions of the apparatus 60, reference is made to the description of the methods according to some example versions of the present invention as described in connection with FIGS. 4 and 5.

Thus, it is noted that the apparatus for use in a virtual network function, and the apparatus for use in a virtual network function manager, generally have the same structural components, wherein these components are configured to execute the respective functions of the network elements, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use in a virtual network function, which comprises:
   detecting a failure;
   determining when to trigger symptom data collection for collecting information about the failure;
   transmitting an indication of a triggering of the symptom data collection to a management function of the virtual network function; and initiating processes for mitigating an impact of the failure, the processes including isolating software impacted by the failure for a predetermined time and restarting and/or reactivating the software.

2. The method according to claim 1, which further comprises:
receiving a request for providing the information about the failure from the management function; and
transmitting the information about the failure to the management function of the virtual network function.

3. The method according to claim 1, which further comprises:
receiving a request for providing the information about the failure from the management function and a target location for the information; and
transmitting the information about the failure directly to the target location.

4. The method according to claim 2, which further comprises:
identifying specific information relevant for the failure; and
transmitting only the specific information to the management function.

5. The method according to claim 4, wherein the specific information relevant for the failure is information about a component and/or software impacted by the failure and/or information in a certain time window during which the failure occurred.

6. A method for use in a management function, which comprises:
receiving an indication of a triggering of symptom data collection from a network function;
collecting information about a failure indicated in a received indication;
storing the information collected in a database; and
initiating processes for mitigating an impact of the failure, the processes including isolating software impacted by the failure for a predetermined time and restarting and/or reactivating the software.

7. The method according to claim 6, wherein the step of collecting the information about the failure further comprises:
requesting the information about the failure from the network function and a virtualized infrastructure manager;
collecting the information about the failure from the network function;
collecting the information about the failure from the virtualized infrastructure manager;
combining the information collected; and
storing combined information in the database.

8. The method according to claim 7, which further comprises:
collecting only specific information relevant for the failure from the network function; and
requesting only specific information relevant for the failure from the virtualized infrastructure manager based on the specific information collected from the network function.

9. The method according to claim 8, wherein the step of requesting the specific information from the virtualized infrastructure manager includes the further steps of:
transmitting information regarding a failed component to the virtualized infrastructure manager; and
collecting specific data about the failed component from the virtualized infrastructure manager based on the information regarding the failed component.

10. The method according to claim 7, which further comprises transmitting a query to separate available application programming interfaces to collect specific information relevant for the failure.

11. The method according to claim 8, wherein the specific information relevant for the failure is information about a component and/or software impacted by the failure and/or information in a certain time window during which the failure occurred.

12. An apparatus for use in a virtual network function, comprising:
at least one processor; and
at least one memory for storing instructions to be executed by said processor, wherein said at least one memory and the instructions are configured to, with said at least one processor, cause the apparatus at least to:
detect a failure;
determine when to trigger symptom data collection for collecting information about the failure;
transmit an indication of a triggering of the symptom data collection to a management function of the virtual network function; and
perform processing for mitigating an impact of the failure, said processing including isolating software impacted by the failure for a predetermined time and restarting and/or reactivating the software.

13. The apparatus according to claim 12, wherein said at least one memory and the instructions are further configured to, with said at least one processor, cause the apparatus at least to:
receive a request for providing the information about the failure from the management function; and
transmit the information about the failure to the management function of the virtual network function.

14. The apparatus according to claim 12, wherein said at least one memory and the instructions are further configured to, with said at least one processor, cause the apparatus at least to:
receive a request for providing the information about the failure from the management function and a target location for the information; and
transmit the information about the failure directly to the target location.

15. The apparatus according to claim 13, wherein said at least one memory and the instructions are further configured to, with said at least one processor, cause the apparatus at least to:
identify specific information relevant for the failure; and
transmit only the specific information to the management function.

16. The apparatus according to claim 15, wherein the specific information relevant for the failure is information about a component and/or software impacted by the failure and/or information in a certain time window during which the failure occurred.

17. An apparatus for use in a management function, the apparatus comprising:
at least one processor; and
at least one memory for storing instructions to be executed by said processor, wherein said at least one memory and the instructions are configured to, with said at least one processor, cause the apparatus at least to:
receive an indication triggering symptom data collection from a network function;

collect information about a failure indicated in the indication received;

store the information collected in a database; and perform processing for mitigating an impact of the failure, said processing including isolating software impacted by the failure for a predetermined time and restarting and/or reactivating the software.

18. The apparatus according to claim 17, wherein the step of collecting the information about the failure further comprises:

requesting the information about the failure from the network function and a virtualized infrastructure manager;

collecting information about the failure from the network function;

collecting information about the failure from the virtualized infrastructure manager;

combining the information collected; and storing the information combined in said database.

19. The apparatus according to claim 17, wherein said at least one memory and the instructions are further configured to, with said at least one processor, cause the apparatus at least to:

collect only specific information relevant for the failure from the network function; and request only specific information relevant for the failure from the virtualized infrastructure manager based on the specific information collected from the network function.

20. The apparatus according to claim 19, wherein the step of requesting the specific information from the virtualized infrastructure manager includes:

transmitting information regarding a failed component to the virtualized infrastructure manager; and collecting specific data about the failed component from the virtualized infrastructure manager based on the information regarding the failed component.

21. The apparatus according to claim 18, wherein said at least one memory and the instructions are further configured to, with said at least one processor, cause the apparatus at least to transmit a query to separate available application programming interfaces to collect the specific information relevant for the failure.

22. The apparatus according to claim 19, wherein the specific information relevant for the failure is information about a component and/or software impacted by the failure and/or information in a certain time window during which the failure occurred.

23. A non-transitory computer-readable medium having computer executable instructions, to be executed on a processing device, for performing a method for use in a virtual network function, which comprises:

detecting a failure;

determining when to trigger symptom data collection for collecting information about the failure;

transmitting an indication of a triggering of the symptom data collection to a management function of the virtual network function; and performing processing for mitigating an impact of the failure, said processing including isolating software impacted by the failure for a predetermined time and restarting and/or reactivating the software.

24. The non-transitory computer-readable medium according to claim 23, wherein the computer executable instructions are directly loadable into an internal memory of the processing device.

25. An apparatus, comprising:

at least one processor configured to:

detect a failure;

determine when to trigger symptom data collection for collecting information about the failure;

transmit an indication of a triggering of the symptom data collection to a management function of a virtual network function; and initiate processes for mitigating an impact of the failure, said processes including isolating software impacted by the failure for a predetermined time and restarting and/or reactivating the software.

26. An apparatus, comprising:

at least one processor configured to:

receive an indication of a triggering of symptom data collection from a network function;

collect information about a failure indicated in the indication received;

store the information collected in a database; and initiate processes for mitigating an impact of the failure, said processes including isolating software impacted by the failure for a predetermined time and restarting and/or reactivating the software.

* * * * *